(No Model.)
E. R. PROCTER.
NUT LOCK.
No. 328,972. Patented Oct. 27, 1885.
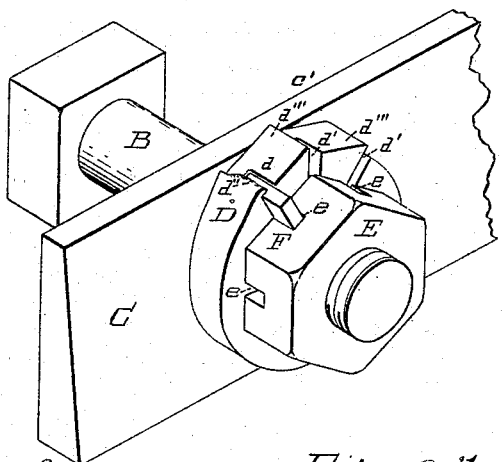
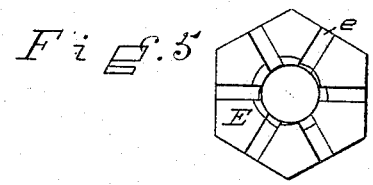
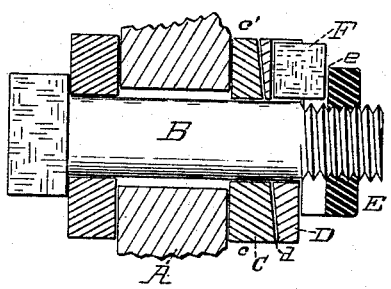
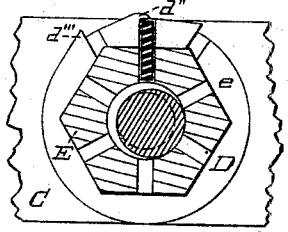
Attest:
A. P. Knight
Geo. L. Wheelock
Inventor:
Edwin R. Procter
By Knight Bros.
Attys.

UNITED STATES PATENT OFFICE.

EDWIN R. PROCTER, OF WASHINGTON COURT-HOUSE, OHIO.

NUT-LOCK.

SPECIFICATION forming part of Letters Patent No. 328,972, dated October 27, 1885.

Application filed February 16, 1885. Serial No. 156,072. (No model.)

*To all whom it may concern:*

Be it known that I, EDWIN R. PROCTER, of Washington Court-House, Fayette county, Ohio, have invented a new and useful Improvement in Nut-Locks, of which the following is a specification.

My invention is an improvement in devices for preventing both accidental and clandestine loosening or removal of screw-nuts from their bolts, and is more especially designed for use upon bolts which unite fish-plates to railway-rails.

In the accompanying drawings, Figure 1 is a perspective view illustrating my invention. Fig. 2 is a section in the plane of the bolt. Fig. 3 is a section on the line 3 3. Fig. 4 shows a modification of my fish-plate. Fig. 5 shows a modification of my nut.

A may represent a portion of a railway-rail which it is desired to fasten. B may represent a customary screw-bolt.

C represents part of a fish-plate having the represented trapezoidal transverse section, so as to make it thicker at one edge, $c$, than at the other edge, $c'$, and by so doing to present a slanting bearing-surface for the washer D, whose sole $d$ or portion which rests upon the fish-plate is correspondingly slanted. The crown of the washer and the sole of the nut E have like radial notches $d'$ $e$, whose angular distance in one member is slightly different to that in the other member in order that not more than two notches, one in each member, shall in any given position of the nut be precisely opposite each other, but so that a slight turn of the nut forward or backward shall bring another couple of notches into coincidence.

F represents a key or colter, which, being thrust or driven into the hole formed by the coincidence of two such notches, prevents rotation of the nut.

To prevent both accidental and mischievous dislodgment or disturbance of the nut, one or both of the salient angles are, after insertion of the key, beaten down so as to form a projecting lip, $d''$.

To facilitate such treatment, one of the angles of each nut-notch is preferably so formed as to project farther outward than the other, as at $d''$. Such relatively greater extension may, however, be omitted, and both angles have the same radial extension, as seen in the modification of nut shown in Fig. 5, and the key being driven in so that its head is sunk somewhat within the periphery of the nut one or both angles may be stove or beaten in to form a lock.

A modification of my fish-bar is seen in Fig. 4, whose chamfered portions are mainly restricted to those parts of the plate touched by the washer. Fish-plates already constructed of the common rectangular pattern may easily be altered to the shape shown in Fig. 4 by a blacksmith.

I claim as new and of my invention—

In a nut-lock, the combination, with a laterally-chamfered fish-plate, C, of a correspondingly-chamfered washer, D, having in its crown a series of radial notches, $d$, and a screw-nut, E, having in its sole a series of like notches, $e$, of slightly different angular separation to the said washer-notches, and a key or colter, F, adapted to be driven into the hole formed by the coincidence of either two of such notches $d$ and $e$, and to be locked therein by the upsetting of one or both the salient angles of such notch $e$, as and for the purposes set forth.

In testimony of which invention I hereunto set my hand.

EDWIN R. PROCTER.

Attest:
GEO. H. KNIGHT,
CHAS. E. PRIOR.